United States Patent [19]
Buhl

[11] 3,836,161
[45] Sept. 17, 1974

[54] LEVELING SYSTEM FOR VEHICLES WITH OPTIONAL MANUAL OR AUTOMATIC CONTROL

[75] Inventor: Walter T. Buhl, Ann Arbor, Mich.

[73] Assignee: Midland-Ross Corporation, Cleveland, Ohio

[22] Filed: Jan. 8, 1973

[21] Appl. No.: 321,686

[52] U.S. Cl. ................................ 280/6 H, 137/557
[51] Int. Cl. ............................................. B60g 17/04
[58] Field of Search ...................... 280/124 F, 6 H; 137/625.69, 557

[56] References Cited
UNITED STATES PATENTS

| | | | |
|---|---|---|---|
| 3,592,226 | 7/1971 | Graham | 137/557 |
| 3,592,485 | 7/1971 | Buhl | 280/124 F |
| 3,605,809 | 9/1971 | Thorson | 137/625.69 |

Primary Examiner—Philip Goodman
Assistant Examiner—John A. Carroll

[57] ABSTRACT

Level-control apparatus for a vehicle suspension system including pneumatic spring devices wherein the body-supporting pressure may be varied automatically in accordance with vehicle loading to maintain a constant average spacial relationship between the body and axle, or to vary the effect of each device on the vehicle by manual individual control. A distribution valve located intermediately in the control system between an air pressure source and the pneumatic devices is operable to shift the system from selective manual adjustment of the pneumatic devices to automatic adjustment of the devices in response to load.

10 Claims, 10 Drawing Figures

PATENTED SEP 17 1974

LEVELING SYSTEM FOR VEHICLES WITH OPTIONAL MANUAL OR AUTOMATIC CONTROL

BACKGROUND OF THE INVENTION

It is presently commercial practice to equip highway vehicles, principally automobiles, with suspension systems which include air chamber components in which the pressure may be varied automatically to maintain a substantially constant average relationship between the axle and the body regardless of load. Air spring equipment on automobiles tends to be of three types, i.e., (1) "air bags" which substitute entirely for the leaf or coil springs conventionally used, (2) combinations of air bags and coil springs, and (3) "air shocks" which are well known devices consisting essentially of a conventional hydraulic shock absorber having an air chamber superimposed thereon on, and connected with, the telescoping members to expand or contract with extension or contraction of the shock absorber length. An inlet to air chamber is provided for adding or subtracting air from the chamber. The air shocks are used in combination with other conventional coil or leaf springs. While the drift of the motor vehicle industry in equipping vehicles with pneumatic suspension equipment is toward the installation of air shocks in preference to air bags, the present invention is applicable to any of the suspensions indicated above. The term "air spring" as used herein refers generically to any vehicle springing system comprising partially or wholly pneumatic support means.

There has been substantial development and commercializing of equipment for level control of vehicles. Components of a level-controlling system such as level-sensing valves, compressors actuated by negative manifold pressures of the vehicle engine, reservoir pressure tanks, and simple manual control valves are well known. The present invention arises out of the need to provide in certain vehicles, especially motor homes, trucks equipped for camping, camping trailers, and the like, resilient supporting means between the body and axles controlled in a manner enabling the vehicle to negotiate the highways with its body maintained at a suitable height relationship with the vehicle's axles and, in addition, to enable raising or lowering of portions of the vehicle by non-automatic control to obtain a level condition of the vehicle body with relation to the earth in a sloping parking site. Moreover, it is desirable, e.g., while the vehicle is moving over the highway, to not only be able to correct the fore-to-aft attitude of the vehicle body relative to its chassis for over-the-road operation but to be able to level the vehicle with respect to its lateral direction in the event of poor side-to-side distribution of the vehicle load. Automatic level adjustment is desirable, e.g., when the concentration of passengers shifts from the front to the rear of the vehicle or vice versa during vehicle movement.

Hence, it is an essential object of this invention to provide both manual and automatic level adjustment in a single control system which may be readily changed from automatic to manual operation, and vice versa.

It is a further object to provide a level-controlling system in a form wherein any valves which must be manually controlled are portions of a panel assembly suited for mounting on or adjacent to the instrument dash of the vehicle or other location within easy reach of the operator's seat.

Another object is to provide a level-control system in accordance with the foregoing object which may be installed on used as well as new vehicles.

SUMMARY OF THE INVENTION

In fulfilling the above and other objects, the present invention resides in apparatus for controlling the level of a vehicle equipped with a suspension system having compressible fluid chamber devices, e.g., air springs mounted operatively between the body or sprung portion and the unsprung portion, i.e., a wheel and axle assembly of the vehicle at at least front or rear of the vehicle. Such apparatus comprises (1) a source of fluid such as a compressed air reservoir; (2) a two-position distribution valve in fluid connection by a separate port thereof with each of the fluid chamber devices; (3) level sensing means mounted in the vehicle in the vicinity of the fluid chamber devices to respond to changes in vertical distance between corresponding adjacent sprung and unsprung portions of the vehicle; (4) a level control valve operated by said level sensing means associated with the fluid chamber devices through the distribution valve to effect leveling adjustment; and (5) a selective control valve for each one of the fluid chamber devices connected by one port with the fluid source and another port with the distribution valve. The level control valve responsive to level sensing means is constructed with an exhaust vent whereby at the high position of the sprung vehicle portion, the valve is positioned to discharge fluid through the exhaust vent. At a low position of the sprung portion, the level control valve feeds fluid into the distribution valve. At an intermediate position, the level control valve blocks all passage of fluid therethrough. Each selective control valve is constructed with an exhaust vent and valve means placing the vent in communication with the distribution valve when relieving pressure on the fluid chamber devices, and other valve means for connecting the air source with the distribution valve to increase the pressure in the air chamber devices. The distribution valve is constructed with a movable portion which can be shifted to a position wherein air may pass in both directions between the sensing valve and the air chamber devices, and another position wherein air may pass through separate channels within the distribution valve which separately place each selective control valve in communication with a corresponding fluid chamber device.

DESCRIPTION OF THE DRAWING

In the drawing with respect to which the present invention is described.

DESCRIPTION OF PREFERRED EMBODIMENT

Figure 1:
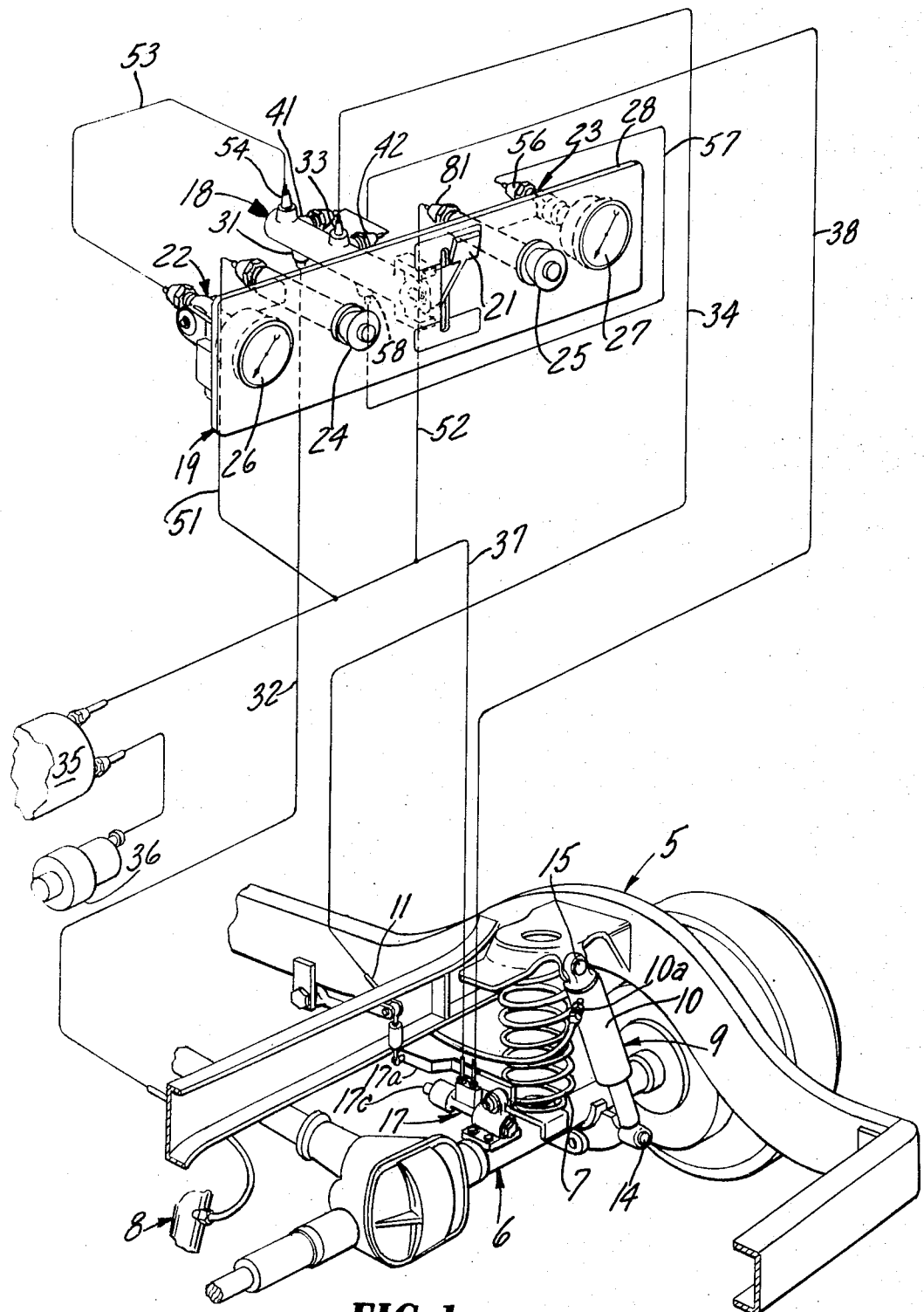
FIG. 1 is a diagrammatic perspective view of a vehicle leveling system in accordance with one embodiment of the invention.
Figure 9:
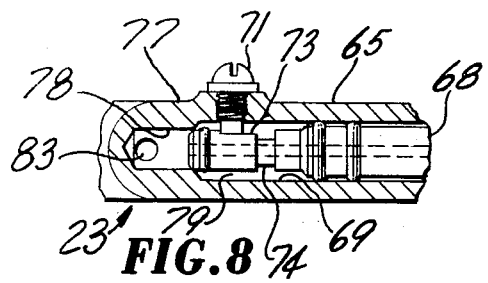
FIG. 9 is a fragmentary view in section of the knob or handle portion of the valve of FIGS. 6 to 8, illustrating the button valve thereof in open position for bleeding air through the distribution valve from a corresponding fluid chamber device.
Figure 10:
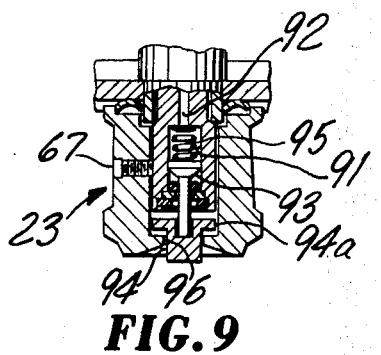
FIG. 10 is an elevation view of fluid chamber device with portions broken away illustrating a typical air shock comprising an hydraulic energy absorber with an air chamber superimposed thereon.

FIG. 1 illustrates schematically the optionally automatic and manual control apparatus for controlling the spacing of a sprung portion or body frame 5 of a vehicle in relation to an unsprung portion or axle and wheel assembly 6. The vehicle parts shown are typical of a rear axle-driven vehicle wherein a pair of coil springs such as spring 7 provide the essential support of the body and frame portion on the axle portion. Shock absorbers 8 and 9 are illustrative of conventional air shocks which, as shown in FIG. 9, are essentially conventional shock absorbers constructed with an inflatable fluid chamber 10 having ends attached to both the "piston" and "cylinder" telescoping hydraulic members of the shock absorber. The fluid air chamber 10 has a port 10a in which line 11 terminates for the transfer of air or other inflating medium into or out of the fluid (air) chamber. Shock absorber 8 is constructed in a similar manner. The shock absorbers 8, 9 are connected between the sprung and unsprung portions at points 14 and 15 in a conventional manner and function in a conventional manner to (1) retard relative movement between the sprung portion 5 and the unsprung portion 6 through energy absorption within the hydraulic mechanism of the shock absorber, and (2) to assist the coil spring (see spring 7) in supporting the body portion of the vehicle on its axle portion through maintenance of air within the air chamber portion of the shock absorbers. As is well known, the pressure within the air chambers of the shock absorbers may be increased as the loading of the sprung portion is increased to maintain the sprung portion at a substantially constant level relative to the unsprung axle and wheel assembly.

Whereas, in conventional level control systems, air is normally supplied to air springs or air shocks directly from a level responsive valve such as the level sensing valve assembly 17, the air chamber devices, i.e., the shock absorbers 8,9, are connected to a distribution valve 18 mounted preferably for convenient access by the vehicle operator. As shown, the valve 18 is a portion of the panel assembly 19 which includes also a control lever 21 of the valve 18, unit valves 22,23, knob controls 24,25, respectively, gauges 26,27 communicating with interior portions of valves 22,23, respectively, which communicate with the distribution valve 18. All portions of the panel assembly just named are attached to or otherwise supported by the panel member 28.

It should be understood that, in the operation of this control system, any fluid passing to or from the fluid chamber devices passes through the distribution valve 18 in either of its positions.

With reference to FIGS. 1, 3, 4 and 5, the distribution valve has an elongate body 47 providing a downwardly pointing port 31 connected with the air chamber of the shock absorber 8 by a line 32, and an upwardly pointing port 33 connected by line 11 with the air chamber of shock absorber 9. Through lines 32,11, air is either passed to or discharged from the shock absorbers. Air for the shock absorbers is supplied by an air source, such as the reservoir 35 and compressor 36 combination.

For automatic operation, air passes through a line 37 through the level control valve 17, then to the distribution valve 18 by way of the line 38 to laterally pointing ports 41,42 of the distribution valve. The internal structure of the valve 18 is depicted in its A position in FIG. 5 for passing air from the ports 41,42 to outflowing ports 31,33, respectively, to the shock absorbers 8,9. It will be noted that with respect to ports 31,41 O-ring seals or dams 45,44 are positioned within the longitudinal bore 46 of the valve body 47 by an elongate valve spool 50 to channel air from the port 41 to the port 31. In a similar manner O-ring seals 48,49 channel air from the port 42 through the bore of the valve body 47 to the port 33 in communication with shock absorber 9.

For manual selective inflation or deflation of the air chambers of the shock absorbers 8,9 air is supplied through lines 51,52 to the selective control valves 22,23, respectively, and thence through the distribution valve 18 to respective air chambers. The valve 22 is shown connected through line 53 with an upwardly pointing port 54 of the distributor valve 18. In a somewhat similar manner, the discharge port 56 of valve 23 is connected through line 57 with a downwardly extending port 58 of the distribution valve 18. When lever 21 of valve 18 is moved to its downward position thereby shifting the spool 50 and the O-ring seals carried thereon in a direction away from the panel element 28, the distribution valve is positioned in its B position for passing air to the shock absorbers from one or both of the selective control valves when these valves have been actuated to pass air therethrough. The position B of valve 18 for selective inflation or deflation of either of the shock absorbers is indicated by positions of O-ring seals 44,45,48,49 as shown in ghost outlines 44a, 45a, 48a, 49a, respectively. An O-ring seal 61 now becomes functional and assumes the position 61a in ghost outline. With the distribution valve 18 in its B position, O-ring 45 is positioned at 45a to stand between ports 31,41 and allow port 31 to communicate with port 54 whereby air may pass from the valve 22 when actuated through the valve 18 to shock absorber 8 through line 32. At position B, O-ring 49 is moved to a position 49a between ports 33,42 allowing air to pass from the port 58 to the port 33 and then to shock absorber 9, thereby effecting passage of air to the shock absorber from the unit valve 23. The O-ring 61 at position 61a cooperates with O-ring 49 in such channeling of air. In a like manner the O-ring 48 cooperates with O-ring 45 at B position of the valve 18 to channel air to the shock absorber 8.

Figure 6:
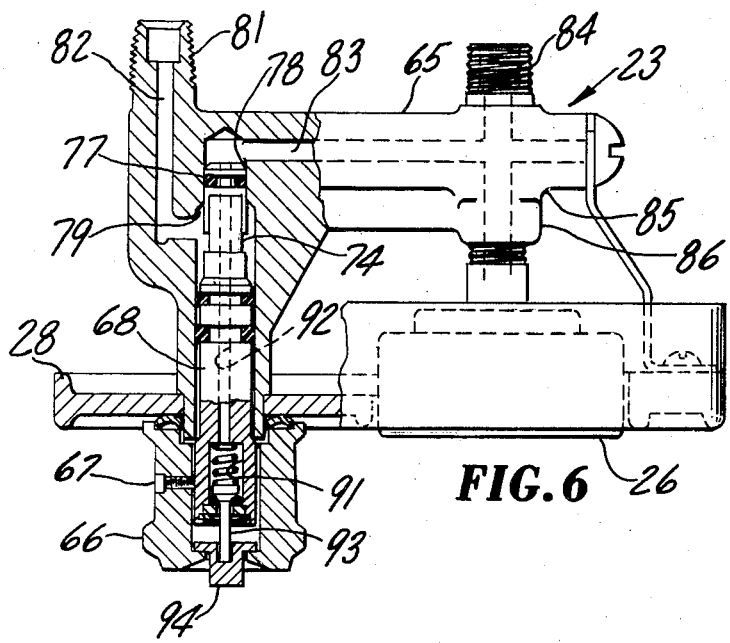
FIG. 6 is a plan view with parts in horizontal cross section of one of the selective control valves of the panel assembly shown in FIGS. 1, 2 and 3.
Figure 7:
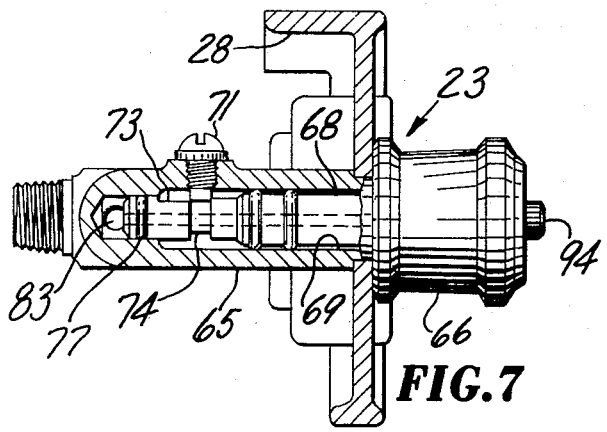
FIG. 7 is an elevation view partially in vertical section of the valve of FIG. 6 illustrating the closed position of the valve.
Figure 8:
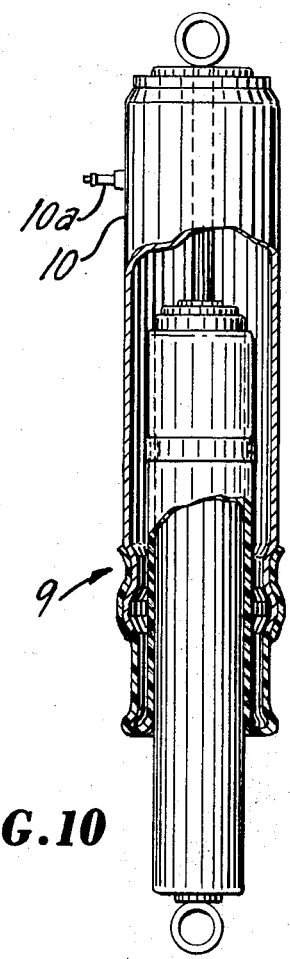
FIG. 8 is a fragmentary view in vertical section illustrating a portion of the valve shown in FIG. 7 in an open position such as used to inflate air springs.

However, as passage of air selectively to the shock absorbers 8,9 through the distribution valve 18 is dependent upon operation of either or both selective control valves 22,23, we look now to FIGS. 6,7 and 8 which are illustrative of the internal structure of either valve although the valve of these figures is identified by numeral 23. As illustrated, the valve is of the sliding spool type and comprises a body 65 clamped or otherwise secured to the panel member 28 in fixed position therewith. The valve further comprises a knob 25 secured by set screw 67 to a shaft extension of a spool 68 capable of rotational and longitudinal movement within the bore 69 of the body 65. The valve 23 is shown in its closed position in FIGS. 6 and 7 wherein the spool is stopped against a stop screw 71. The valve is normally secured in its closed position by rotation of a flat area 73 out of radial registry with the stop screw 71 so that the end of the stop screw is received within a circumferential groove 74 of the spool, thereby entrapping the end of the stop screw within the groove. As the knob 25 is secured to the spool, rotation thereof to different angular positions is readily obtained by manually turning the knob.

Open position of the valve as shown in FIG. 8 may be easily obtained by rotating the spool 68 to bring the flat area 78 into registry with the end of the stop screw 71. At this position, the spool 68 may be moved longitudinally to dispose the flat surface 73 directly under the end of the stop screw. When thus positioned, the end of the spool 68 and the O-ring 77 entrapped thereon are positioned rearwardly of a constricted portion 78 of the bore 69 within the enlarged portion of the bore at 79. At this position of the spool 68, air under pressure entering the valve at port 81 may pass from the passageway 82 into the passageway 83 of the valve and outwardly through port 51 connected with line 57 terminating in the distribution valve 18. The valve 23 further provides a manifold portion 85 having an outlet 86 for receiving a threaded nipple portion of the gauge 27 which may always be placed in communication with its respective shock absorber by adjustment of the distribution valve to the "down" or B position of the handle 21. The pressure on each shock absorber will be immediately registered in the gauge of the corresponding unit valve and such unit valve is now ready for operation for either inflation or deflation of the associated shock absorber.

Deflation of a shock absorber is obtainable by operation of additional mechanism of the valve 23 comprising a valve chamber 91 located within that portion of the spool 68 housed within the knob 25 and connected by a longitudinal bore 92 to the passageway 83 of the valve. The deflating valve mechanism further comprises a poppet valve 93 having its head received in the chamber 91 and its stem extending outwardly of the adjacent end of the rod into engagement with an operating button 94. The poppet valve 93 is urged toward the button 94 by a spring 95 located within the valve chamber in engagement with the poppet valve head and the opposing end of the chamber.

When the valve button 94 is depressed as shown in FIG. 9, air may flow from the passageway 83 outwardly through the bore 92, chamber 91, around the poppet valve head and stem to the end of the piston rod and around the button flange 94a and outwardly of the knob aperture 96 provided for the button stem. The structure of valves 22,23 is described in further detail in U.S. Pat. No. 3,592,226.

Figure 2:
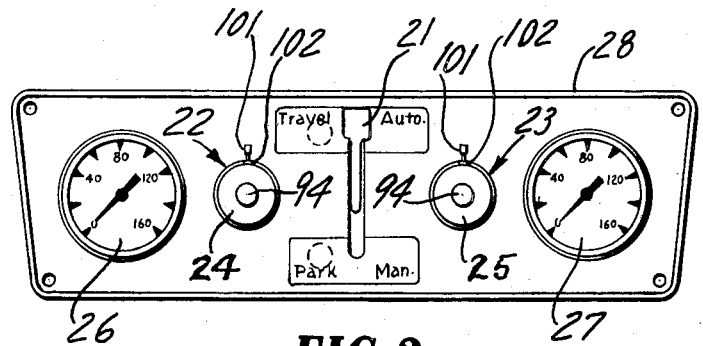
FIG. 2 is a face view of a control panel assembly shown also in FIG. 1.
Figure 3:
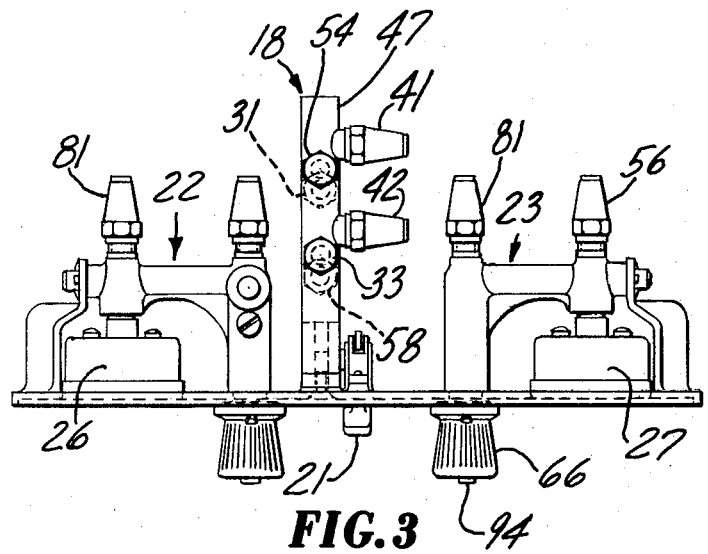
FIG. 3 is a plan view of the panel assembly as shown in FIG. 2.
Figure 4:
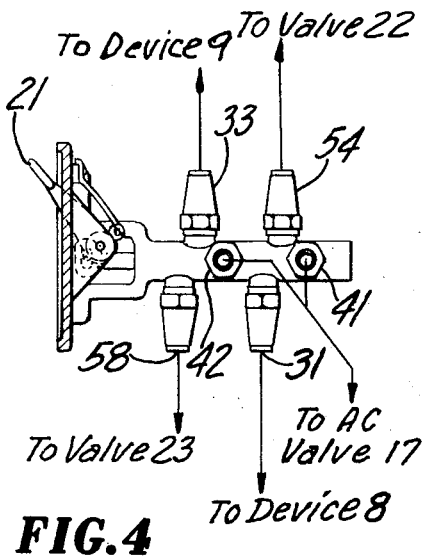
FIG. 4 is a side elevation of the panel assembly shown in FIGS. 2 and 3.
Figure 5:
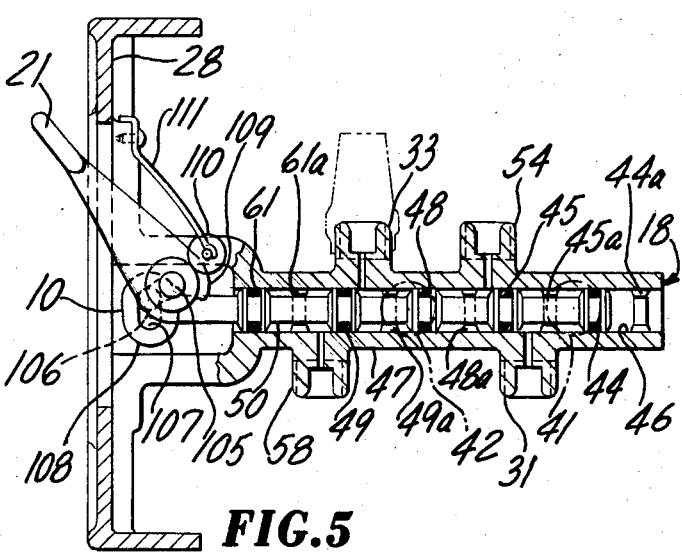
FIG. 5 is an enlarged side elevation with portions shown in vertical section to illustrate especially the internal structure of the distribution valve.

Regarding manual operation of the valves from the face of the panel member 28 with reference to FIG. 2, an index mark 101 on the member 28 adjacent the knob and an index mark 102 on the knob may be brought into registry to indicate radial registry of the flat surface 73 with the stop screw 71. At this point the knob of valve 22 or valve 23 may be pulled outwardly from panel member 28 to allow air to flow through the valve between its inlet port, e.g., port 81, and outlet port, e.g., port 56 of valve 23. When inflation of a shock absorber is finished, the knob is pushed inwardly toward the member and twisted to carry index 102 out of registry with index 101 whereby the flat surface 73 is rotated out of registry with the stop screw 71, the spool 68 is locked in longitudinal position with the stop screw. Deflation of a shock absorber is accomplished with spool locked inward and by depressing the button 94 as hereinbefore described. For deflation of the shock absorbers, the lever 21 of valve 18 must be in a "down" or B position, i.e., the same position as for inflation.

Upward position of the lever 21 places the shock absorbers in communication with the level sensing valve 17 which may either relay air from the air source 35,36 through the distribution valve 18 to the shock absorber in a downward position of the arm 17a of valve 17, exhaust air from the shock absorbers, by way of the valve 18 at an upward position of the arm 17a, or block air to or from the shock absorbers at an intermediate position of the arm 17a.

The spool 50 of valve 18 is movable lengthwise of its bore 46 through structure of the valve body 47 which provides that the lever 21 is pivotally mounted on a pin 105 fixed to the valve body 47 and a crank pin 106 fixed to the lever 21 in eccentric relation with the pin 105. The pin 106 thus travels in an arcuate movement when the lever 21 is shifted about the axis of the pin 105. By being received in a transversely elongate opening or slot 107 of an apertured head portion 108 of the spool 50, the pin 106 is able to effect linear movement of the spool 50 during swinging movement of the handle 21. A cam 109 on the lever 21 and a cam follower roll 110 supported by the spring 111 fixed to panel element 28 resiliently hold the lever 21 in its two operating positions.

What is claimed is:

1. Automatic and selectively-manual control apparatus for controlling level of a vehicle having a suspension system which includes at least two contractible and expandable fluid chamber devices mounted as supports between sprung and unsprung portions of the vehicle; said apparatus comprising:

a source of fluid;

a level sensing valve mounted on one of said portions and having means continuously connected with the other of said portions to cause operation of the valve through relative movement of said portions;

said valve having an inlet port connected with said source, an exhaust port and a delivery port;

said valve having means movable between an exhaust position placing its delivery port in communication with its exhaust port, a delivery position placing its inlet port in communication with its delivery port, and a neutral fluid-blocking position between said exhaust and delivery positions;

a pair of selective control valves, each control valve corresponding to one of said devices and having an inlet port connected with said source, an outlet port, and an exhaust port;

each selective control valve having movable means normally positioned to block passage of fluid therethrough but movable to place said inlet port in communication with the outlet port, and further movable to place said outlet port in communication with said exhaust port;

a distribution valve for the fluid comprising a first pair of ports separately connected with said devices, a second pair of ports separately connected to respective outlet ports of said selective control valves, port means connected with said sensing valve delivery port, and means in said distribution valve movable between a first position and a second position, said distribution valve being constructed to provide a channel for fluid therethrough from said port means to the first pair of ports at the first position, and to channel fluid therethrough in separate channels from said second pair of ports to said first pair of ports.

2. Automatic and selectively-manual control apparatus for controlling level of a vehicle having a suspension system which includes a plurality of fluid chamber devices mounted as supports for expansion and contraction between sprung and unsprung portions of the vehicle; said apparatus comprising:

a source of fluid;

a level sensing valve means comprising at least one level sensing valve mounted on one of said portions and having means continuously connected with the other of said portions to cause operation of the valve through relative movement of the portions;

said valve having an inlet port connected with said source, an exhaust port and a delivery port;

said valve having means movable between an exhaust position placing its delivery port in communication with its exhaust port, a fluid delivery position placing its inlet port in communication with its delivery port, and a neutral fluid-blocking position between said exhaust and fluid-delivery positions;

a plurality of selective control valves, each control valve corresponding to one of said devices and having an inlet port connected with said source, an outlet port, and an exhaust port;

each selective control valve having movable means normally positioned to block passage of fluid therethrough but movable to place said inlet port in communication with the outlet port, and movable to place said oulet port in communication with said exhaust port;

a fluid distribution valve comprising a plurality of ports separately connected with said devices, a second and like plurality of ports separately connected to respective outlet ports of said selective control valves, port means connected with said sensing valve delivery port, and means in said distribution valve movable between a first position and a second position, said distribution valve being constructed to provide passage for fluid therethrough from said port means to said first plurality of ports at the first position, and to channel fluid therethrough in separate channels from said second plurality of ports to said first plurality of ports at said second position.

3. The apparatus of claim 2 comprising:

a plurality of gauges, each mounted on one of said selective control valves in direct communication with the outlet port thereof.

4. The control apparatus of claim 2 comprising:

a panel element having a viewing face and supporting said selective control valves and said distribution valve, each valve comprising manual control means for positioning said movable means thereof, said manual control means being exposed for manual access along said face and said assembly being adapted for preassembly as a unit for attachment to a vehicle.

5. The apparatus of claim 2 wherein:

said distribution valve is of the sliding spool type comprising a body having an elongate bore, and an elongate spool having a head located exteriorly of the bore, a control lever pivoted on said body adjacent said head, said head and said lever forming a pin-and-slot connection thereof effecting axial movement of the spool with swinging movement of the lever, said lever having a distal handle portion disposed outwardly of the body.

6. Automatic and selectively-manual control apparatus for controlling level of a vehicle having a suspension system which includes at least two air chamber devices mounted as supports for linear expansion and contraction between sprung and unsprung portions of the vehicle; said apparatus comprising:

a compressed air source;

a level sensing valve mounted on one of said portions and having means continuously connected with the other of said portions to cause operation of the valve through relative movement of the portions;

said valve having an inlet port connected with said source, an exhaust port and a delivery port;

said valve having means movable between an exhaust position placing its delivery port in communication with its exhaust port, an air delivery position placing its inlet port in communication with its delivery port, and a neutral air-blocking position between said exhaust and airdelivery positions;

a pair of selective control valves, each control valve corresponding to one of said devices and having an inlet port connected with said source, an outlet port, and an exhaust port;

each selective control valve having movable means normally positioned to block passage of air therethrough but movable to place said inlet port in communication with the outlet port, and movable to place said outlet port in communication with said exhaust port;

an air distribution valve comprising a first pair of ports separately connected with said devices, a second pair of ports separately connected to respective outlet ports of said selective control valves, and a third pair of ports connected with said sensing valve delivery port, and means in said distribution valve movable between a first position and a second position, said distribution valve being constructed to provide a channel for air therethrough from said third pair of ports to the first pair of ports at the first position, and to channel air therethrough from said second pair of ports to said first pair of ports at said second position.

7. The apparatus of claim 6 comprising:

a pair of gauges, each mounted on one of said selective control valves in direct communication with said outlet port thereof.

8. The control apparatus of claim 6 comprising:

a panel element having a viewing face and supporting said selective control valves and said distribution valve, each valve comprising manual control means for positioning said movable means thereof, said manual control means being exposed for manual access along said face, said assembly being adapted for preassembly as a unit for attachment to a vehicle.

9. The apparatus of claim 6 wherein:
said distribution valve is of the sliding spool type and comprises a body having an elongate bore, an elongate spool within said bore having a head located exteriorly of the bore, and a control lever pivoted on said body adjacent said head, said head and said lever forming a pin-and-slot connection thereof effecting axial movement of the spool with swinging movement of the lever, said lever having a distal handle portion disposed outwardly of the body.

10. The apparatus of claim 6 comprising:
a panel element having a viewing face and supporting said selective control valves and said distribution valve;
said distribution valve being of the sliding spool type comprising a body having an elongate bore, an elongate spool within said bore having a head located exteriorly of the bore, said head having a slot which is elongated in a direction transversely of the bore axis and opens in a direction which is transverse to the direction of slot elongation and the bore axis, a control lever pivoted on said body adjacent said head and having a crank pin in spaced relation with its pivot axis received in said slot, said lever having a distal handle portion disposed outwardly of said body and said viewing face.

* * * * *